Patented Sept. 21, 1937

2,093,786

UNITED STATES PATENT OFFICE 2,093,786

METHOD OF PRESERVING EGGS AND PRODUCTS

Arthur V. Swarthout, San Francisco, and Miroslav Tamele, Oakland, Calif., assignors to Ovolo Incorporated, Oakland, Calif., a corporation of California No Drawing. Application April 10, 1934, Serial No. 719,892

16 Claims. (Cl. 99—113)

The present invention relates to the substantial destruction of microorganisms in eggs and/or the substantial inhibition of bacteria growth and/or the preservation of eggs for commercial purposes and to the products resulting therefrom. More particularly it is concerned with the pasteurization in vacuo or under a partial pressure of oxygen substantially less than one-fifth of an atmosphere of egg contents whereby the materials are preserved or guarded against spoilage for indefinite periods, budding yeasts killed and the activity of molds obviated.

The process is adapted for the treatment of whole eggs removed from their shells, of mixtures of whites and yolks combined in different proportions, of yolks alone and of egg whites alone, although in those cases where treatment with an edible, neutral salt system is included, the step of treating whites per se may be excluded.

Numerous methods have been proposed for preserving eggs in their natural wholesome condition and without objectionable flavor and odor. Some of the best known of these methods are freezing, desiccating, dehydrating or ageing. As customarily practiced by others, the mere freezing, drying, evaporating or ageing processes inevitably fail to prevent decomposition and/or fermentation of the eggs and the accompanying well-known objectionable odor and flavor.

Our present invention relates to the preservation and/or pasteurization and the like of broken whole eggs, egg yolks, any admixture of egg yolks and whites, and whites so that they may be kept in liquid form without deterioration or impairment for indefinite periods. It also comprises the preparation of preserved, partially dehydrated egg contents and the manufacture of egg preparations of syrup-like consistency and the like.

Our invention may be practiced in the following manner. The egg contents are intimately incorporated or thoroughly mixed via agitation, centrifuging or in any suitable manner known to the art with an effective amount of an hydroxylated, edible, water-soluble carbon compound, whose hydroxy group or groups may be esterified and/or etherified, adapted to function as a preservative and/or as an emulsion stabilizer and/or as a solubilizing medium and/or as an agent effective in raising the coagulating temperature of the egg mass substantially above that of the untreated egg mass. Among the numerous compounds available may be enumerated the polyhydric alcohols as the glycols, the polyglycols, glycerol, the carbohydrates including the sugars known as the monoses, disaccharides and polysaccharides, their ethers, esters and mixed ether-esters, molasses, honey, and other equivalent syrups, ethyl alcohol, tartaric acid, lactic acid, malic acid, and the water-soluble salts thereof, the alkylolamines etc. A sufficient quantity of the hydroxylated compound or its derivative is incorporated with the egg mass to produce a substantially homogeneous liquid mass when the mixture is heated from about a moderately elevated temperature to one slightly above the normal coagulation temperature of the untreated egg mass, i. e. from about 100° to about 145° F., at atmospheric pressure. When employing polyhydric alcohols of the nature of carbohydrates such as the sugars, we preferably utilize from about 40 to 60% by weight of the same while homogenizing at a temperature in the neighborhood of 145° F. This operation is effectively executed on a water-bath although other suitable heating means may be resorted to. As a result of this treatment, the mixture undergoes several fundamental changes. It forms a homogeneous, liquid egg product whose coagulation temperature, in many cases, especially where carbohydrates as sugars have been utilized, is above that of untreated albumin, which product is already in a substantially preserved state in a majority of instances. Where sugars are employed, particularly the di- and tri-saccharides, inversion thereof takes place. The inversion is usually directly proportional to the total length of heat treatment. It is, for bakers, a highly desirable characteristic as levulose apparently preserves the moisture in baked products. The osmotic pressure is increased considerably with the inversion of sugars and is apparently a main factor in the prevention of bacteria growth. The addition of invertase is helpful in certain cases, as for example, with beet sugar. The membranes, germs, strings or chalazae are substantially completely dissolved or disintegrated in certain cases, thus obviating the necessity for straining with the consequent loss of egg contents. Straining may be resorted to when, due to negligence in temperature control, addition of certain agents, etc., slight coagulation may ensue or when an hydroxylated compound is employed which does not function to materially dissolve or disintegrate the fibrous materials. The intimately incorporated hydroxylated compound or derivative completely permeates the entire disintegrated cellular structure of the egg contents thus obviating local decomposition and thereby retaining the viscosity and beating and other desirable properties of the egg product. When incorporated in baked products, the latter may be kept moist by the selection of appropriate hydroxylated compounds of suitable hygroscopicity. Not only is the egg viscosity increased in certain instances but, as a general rule, the proteinaceous, colloidal particles are prevented from agglomerating.

In executing the homogenizing step, it is desirable to avoid beating or foam formation as otherwise air is entrained or entrapped in the egg product thereby impairing the preservative effect of the various operations. Consequently, where mixers are resorted to, they should, desirably, be substantially completely submerged in the admixed egg product containing one or more of the hydroxylated compounds.

The resulting admixed egg product then is cooled by suitable cooling means to about room temperature or slightly higher, i. e., from about 70° to 90° F., at atmospheric pressure. This cooling stage is essential and preparatory to the incorporation of one or more edible, water-soluble neutral salts such as sodium chloride, sodium acetate, sodium phosphate, sodium citrate, sodium tartrate, sodium lactate, sodium malate, sodium succinate, etc., as well as the corresponding ammonium salts. These neutral salts effect certain fundamental alterations in the characteristics of the egg product. The original opaque, golden-yellow-colored mixture of honey-like consistency is clarified especially in the additional presence of a sugar, its opacity is removed and its consistency changed to a syrup-like liquid, i. e., its viscosity is slightly lowered. The color, also, is considerably darkened and the flavor is improved. The resulting product is a bright, clear, syrup-like liquid of amber color, greatly improved for cake baking and the like.

It is desirable that the neutral salt or clarifying agent and controller of viscosity be added within the proper temperature range as the clarifying action is seriously retarded at those temperatures at which there is a relatively slow rate of solution of the neutral salt system in the admixed egg product. On the other hand, too elevated temperatures prevent the neutral salt system from functioning as a clarifying agent as well as impair the control of viscosity of the egg product. At the proper temperatures, the clarifying agent permeates smoothly and quickly throughout the egg product and, in certain instances, a slight stirring or agitation is sufficient to hasten and insure the thorough dissemination of the neutral salt system.

The quantity of neutral salt or clarifying agent to be added is quite small, varying from about 0.2 to 2% by weight although we have found quantities of from about 0.5 to 1% quite satisfactory. The exact quantity to be added will depend on the desired viscosity of the end-product and on the desired shade of color of the same.

Upon completion of the clarifying and viscosity control step which ordinarily requires about 15 minutes per 200 pounds of yolks and whites and about 12 minutes per 100 pounds of yolks and whites containing about 50% by weight of sugar, the liquid egg composition may be permitted to ripen or age for any desirable period, say from about 6 to 36 hours. This procedure is believed to accomplish the proteolytic decomposition of proteins and enhance the leavening powers of the final product.

At the completion of this ripening period, or after the clarifying stage when ripening is not resorted to, the intermediate product may be sealed hot, warm or cold (room temperature) in containers, preferably under a high vacuum. By sealing under sub-atmospheric pressures, air and other occluded deleterious gases are expelled substantially completely from the egg product thus further insuring the keeping qualities of the finished egg product. The degree of vacuum may vary but should be preferably as nearly absolute as possible without causing the containers to collapse.

Mold spore activity can be decreased by replacing air with nitrogen, $CO_2$ and/or other inert gases, the sealed product being then accorded a treatment or treatments corresponding to those given to egg contents sealed in vacuo.

The hot treatment comprises sealing while the egg product is at a moderately elevated temperature, say from about 150° to 160° F., and may be utilized to produce the existing low pressure in the containers. The filled containers, as soon as they have been sealed, are cooled, preferably under water. The purpose of this step is to fairly rapidly cool the entire contents of the containers; otherwise the material in the center of the container remains warm for a relatively long period thus favoring coagulation of part of the egg product.

Whether the egg product is sealed cold, warm or hot, after it has been sealed and is approximately at room temperature or say 80° F., it may be permitted to ripen or age for a suitable period for the purpose previously described. Whether or not the sealed product is permitted to undergo ripening, it is subjected to one or more successively spaced heat treatments whereby pasteurization of the end-product is substantially effected. A suitable temperature range is from 155° to 170° F., the period of treatment sufficient to effect substantial microorganism destruction varying with the bulk, the temperature, the degree of vacuum and the composition of the egg product. Heating to about 160° F., from about one-half to one and one-fourth hours usually suffices for each heating. With 8 pounds of egg products/#10 tins, one hour is usually sufficient. The pasteurization of the product is essential in order to destroy or inhibit the growth of the sugar-tolerant yeasts which may be present and which favor bacteriological decomposition and/or paralyze or inhibit the growth of bacteria.

The products then are cooled quickly to not higher than 85° F., preferably between 70° to 80° F., in order to prevent coagulation occurring through the relatively slow dissipation of heat. If desired, the heat or pasteurization treatment followed by relatively rapid cooling may be repeated one or more times preferably executed at least twice, thus completely insuring the inhibition of any bacterial activity. It is desirable to reheat the product after a period of ripening of about twenty hours or more has elapsed. When the method thus described is carefully carried out, the resulting product has a color, flavor and mobility highly desirable in the culinary uses to which it is put, and is capable of being stored for indefinite periods without deterioration or alteration of these characteristics.

Variants of different stages of our process may be practiced. For example, egg contents may be strained prior to admixture with hydroxylated carbon compounds, which straining operation may or may not be preceded by an ageing or ripening period. Alternatively, after admixture of the egg contents and hydroxylated carbon compound, the mixture may be strained before being subjected to the first heat treatment.

Still another modification may be practiced by subjecting an admixture of egg contents and hydroxylated carbon compound, with or without incorporation of a neutral, edible, water-soluble salt system, to packaging in vacuo while hot or cold without a preceding heat treatment and subsequently subjecting the sealed product to one or more heat or pasteurization treatments followed by relatively rapid cooling operations. The air in the container may have been displaced by an inert gas in lieu of packaging in vacuo.

Where partially or moderately dehydrated products are desired, the first heat treatment may be carried at higher temperatures or for longer periods or may be supplemented by blowing inert gases through the liquid mass or by execution at subatmospheric pressures. The quantity of water to be removed will control the character of the treatment, the time of execution, and will result in greater thermal stability of the product.

The expressions "egg contents" and "egg meat", as used throughout the specification and claims, are intended to embrace broken whole eggs, yolks and whites of eggs in varying proportions, and yolks or whites alone, whether with their original water content or less.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. The method of preserving egg contents which comprises subjecting a mixture of egg meat and a preservative quantity of an edible, water-soluble compound of the class consisting of hydroxylated carbon compounds, their ethers, esters and salts in a sealed receptacle to a pasteurization temperature at which substantial destruction of micro-organisms is effected and for a time at which substantial coagulation of albumen is avoided, relatively rapidly dissipating the heat from the sealed product, allowing the product to age for a suitable period and repeating the heating and cooling treatments at least once again.

2. The method of preserving egg contents which comprises subjecting a mixture of egg meat and a preservative quantity of sugar in a sealed receptacle to a temperature at which substantial destruction of micro-organisms is effected and for a time at which substantial coagulation of albumen is avoided, relatively rapidly dissipating the heat from the sealed product, allowing the product to age for a suitable period and repeating the heating and cooling treatments at least once again to ensure the substantial inhibition of any bacterial activity.

3. The method of preserving egg contents which comprises heating the same with a quantity of sugar sufficient to produce a smooth flowing homogeneous liquid mass while avoiding substantial coagulation of albumen, separating membranous material from said mass, sealing said mass in a receptacle, heating the sealed product to a pasteurization temperature while avoiding substantial coagulation of albumen, relatively rapidly cooling the sealed product, allowing the sealed product to age for at least six hours and repeating the heating and cooling treatments at least once again.

4. The method of preserving egg contents which comprises heating a mixture of egg meat and sugar containing between 40 and 60%, by weight, of sugar in a sealed receptacle to from about 155° to 170° F. for a time at which substantial coagulation of albumen is avoided, relatively rapidly cooling the product to below about 85° F., allowing the product to age for at least several hours and repeating the heating and cooling treatments at least once again to ensure the substantial inhibition of any bacterial activity.

5. The method of preserving egg contents which comprises heating egg meat with a preservative quantity of sugar to a pasteurizing temperature whereat a substantially homogeneous liquid mass is attained while avoiding the substantial coagulation of albumen, cooling the mixture to about 70° to 90° F., adding a quantity of a water-soluble, edible, neutral salt sufficient to clarify the mixture, sealing the mixture in a receptacle, pasteurizing the mixture while avoiding substantial coagulation of albumen and relatively rapidly dissipating the heat from the sealed product.

6. The method of preserving egg contents which comprises mixing egg meat with such a quantity of sugar at an elevated temperature whereat a substantially homogeneous liquid mass containing about 40 to 60%, by weight, of sugar is attained while avoiding the substantial coagulation of albumen, cooling the mixture to about 70° to 90° F., adding from about 0.2 to 2%, by weight, of sodium chloride, sealing the mixture in a receptacle, pasteurizing the mixture while avoiding substantial coagulation of albumen and relatively rapidly dissipating the heat from the sealed product.

7. The method of preserving egg contents which comprises subjecting egg meat mixed with a preservative quantity of sugar and a clarifying quantity of sodium chloride while sealed in a container to a pasteurizing treatment while avoiding substantial coagulation of albumen, relatively rapidly dissipating the heat from the sealed product, allowing the product to age for a suitable period and repeating the heating and cooling treatments at least once again to ensure the substantial inhibition of any bacterial activity.

8. The method of preserving egg contents which comprises heating egg meat with a preservative quantity of sugar to about 145° F. for a time sufficient to form a homogeneous product, permitting the mixture to cool to about 70 to 90° F., subjecting the mixture to an ageing period of at least six hours, sealing the mixture in a receptacle, pasteurizing the mixture while avoiding substantial coagulation of albumen and relatively rapidly dissipating the heat from the sealed product at the end of the pasteurization treatment.

9. The method of preserving egg contents which comprises heating a mixture of egg meat and sugar containing about 40 to 60%, by weight, of sugar to about 145° F. for a time sufficient to form a homogeneous product, permitting the mixture to cool to about 70 to 90° F., adding a quantity of a water-soluble, edible, neutral salt sufficient to clarify the mixture, subjecting the mixture to an ageing period of at least six hours, sealing the mixture when sealed in a receptacle while avoiding substantial coagulation of albumen and relatively rapidly dissipating the heat from the sealed product at the end of the pasteurization treatment.

10. The method of preserving egg contents which comprises heating egg meat with a preservative quantity of an edible, water-soluble compound of the class consisting of hydroxylated carbon compounds, their ethers, esters and salts to a pasteurization temperature while avoiding the substantial coagulation of albumen, sealing the mixture in a receptacle and pasteurizing the sealed mixture while avoiding the substantial coagulation of albumen.

11. The method of preserving egg contents which comprises heating egg meat with a preservative quantity of sugar to a pasteurization temperature while avoiding the substantial coagulation of albumen, cooling the mixture, sealing said mixture in a receptacle, pasteurizing the sealed mixture while avoiding the substantial coagulation of albumen and relatively rapidly dissipating the heat from the sealed product.

12. A preserved, clear, heat-treated egg product of substantially inhibited bacterial activity, which is relatively stable under atmospheric conditions and which contains a preservative quantity of sugar and a clarifying quantity of sodium chloride.

13. A preserved, clear, heat-treated egg product of substantially inhibited bacterial activity, which is relatively stable under atmospheric conditions and which contains about 40 to 60%, by weight, of sugar and about 0.2 to 2% sodium chloride.

14. A preserved, clear, heat-treated egg product of substantially inhibited bacterial activity, which is relatively stable under atmospheric conditions and which contains about 40 to 60%, by weight, of sugar and a clarifying quantity of sodium chloride.

15. A preserved, clear, heat-treated egg product of substantially inhibited bacterial activity, which is relatively stable under atmospheric conditions and which contains a preservative quantity of an edible, water-soluble compound of the class consisting of hydroxylated carbon compounds, their ethers, esters and salts and a clarifying quantity of sodium chloride.

16. A preserved, clear, heat-treated egg product of substantially inhibited bacterial activity, which is relatively stable under atmospheric conditions and which contains a preservative quantity of sugar and a clarifying quantity of a water-soluble, edible, neutral, inorganic salt which is not a reducing agent.

ARTHUR V. SWARTHOUT.
MIROSLAV TAMELE.